United States Patent
Cox et al.

[11] Patent Number: 6,151,788
[45] Date of Patent: Nov. 28, 2000

[54] LASER BEAM FOR SIGHT ALIGNMENT

[76] Inventors: Stacey Cox; Danny Young, both of 1700 Loop Rd., Vidalia, Ga. 30474

[21] Appl. No.: 09/170,677

[22] Filed: Oct. 13, 1998

Related U.S. Application Data

[63] Continuation-in-part of application No. 08/911,100, Aug. 14, 1997, abandoned.

[51] Int. Cl.[7] .............................. F41G 1/54; G01B 11/27
[52] U.S. Cl. ....................... 33/286; 33/234; 33/DIG. 21
[58] Field of Search .............................. 33/286, 234, 241, 33/DIG. 21

[56] References Cited

U.S. PATENT DOCUMENTS

| | | | |
|---|---|---|---|
| 3,782,832 | 1/1974 | Hacskaylo | 33/234 |
| 4,879,814 | 11/1989 | Wallace et al. | 33/234 |
| 5,001,836 | 3/1991 | Cameron et al. | 33/234 |
| 5,365,669 | 11/1994 | Rustick et al. | 33/234 |
| 5,437,104 | 8/1995 | Chien | 33/286 |
| 5,448,834 | 9/1995 | Huang | 33/234 |
| 5,454,168 | 10/1995 | Langner | 33/234 |
| 5,568,265 | 10/1996 | Matthews | 33/286 |
| 5,987,762 | 11/1999 | Toth et al. | 33/286 |

*Primary Examiner*—Christopher W. Fulton

[57] ABSTRACT

A new laser beam for sight alignment for projecting a beam of a light out of gun for the sight to be adjusted until it aligns with a dot formed by the beam on a target. The inventive device includes a hollow cylindrical casing having a main cylindrical portion and a tapered end portion. The tapered end portion is coextensive with the main cylindrical portion. The main cylindrical portion has an open interior end. The tapered end portion has an opening in an outer end thereof. The cylindrical casing is dimensioned for being slidably received within a chamber of a gun. A lens is disposed within the opening in the outer end of the tapered end portion of the cylindrical casing. A laser module is disposed within the tapered end portion of the cylindrical casing inwardly of the lens.

7 Claims, 4 Drawing Sheets

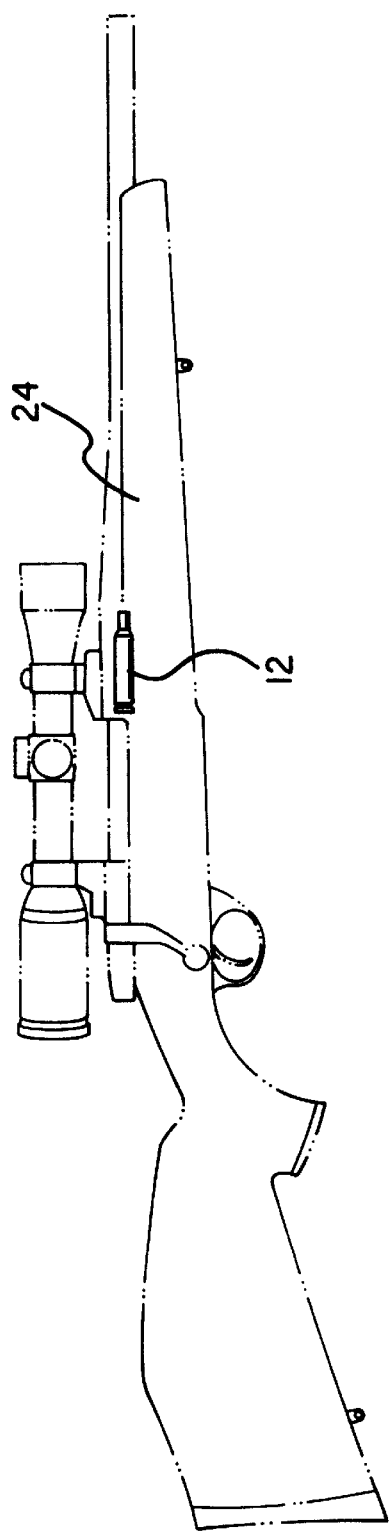
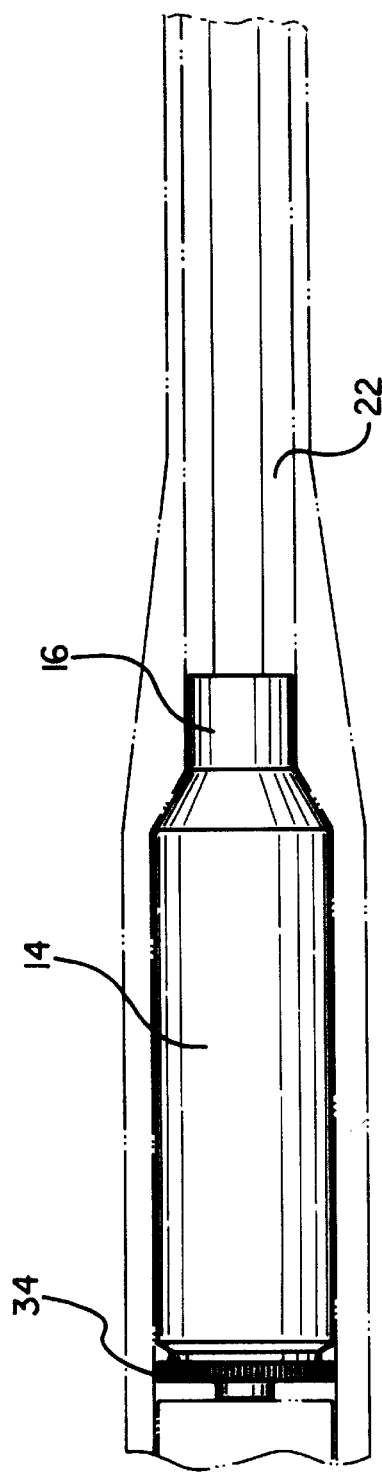

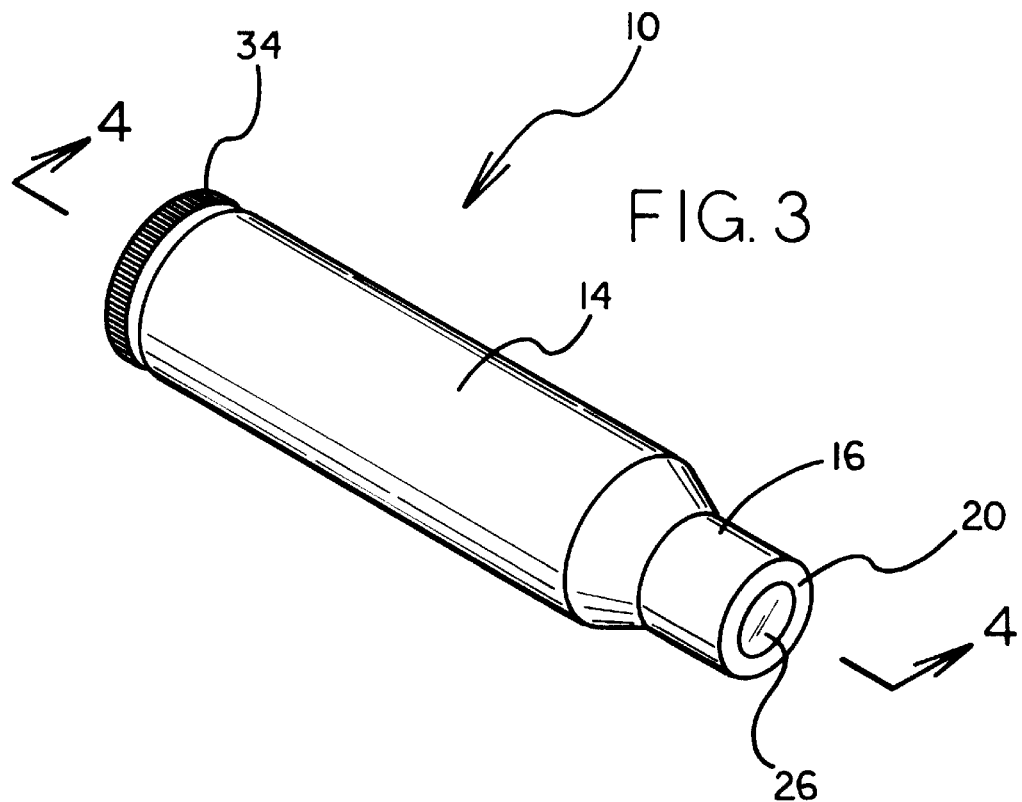
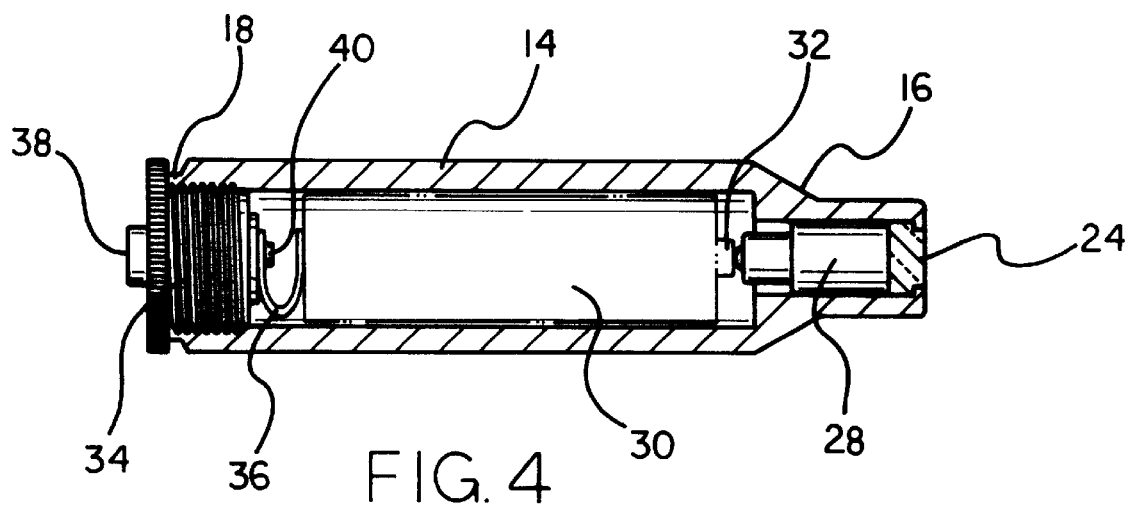

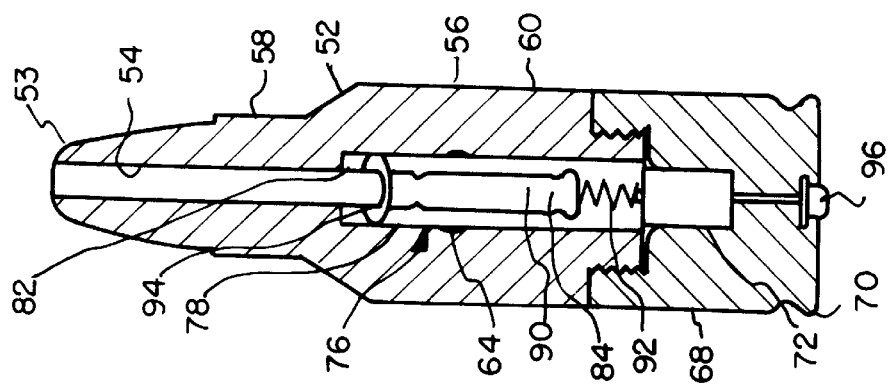
FIG. 6
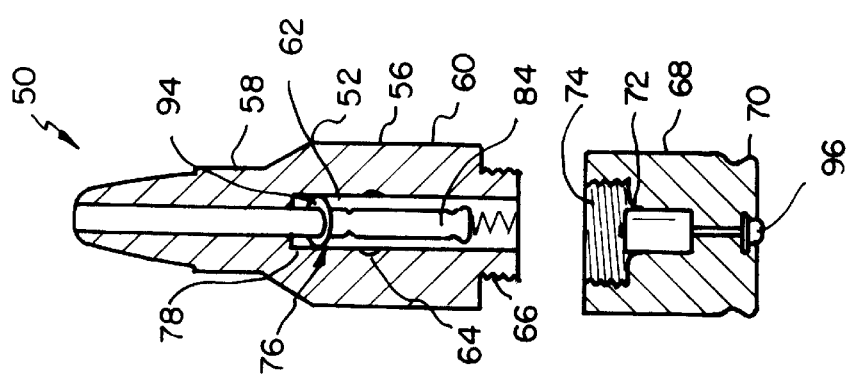
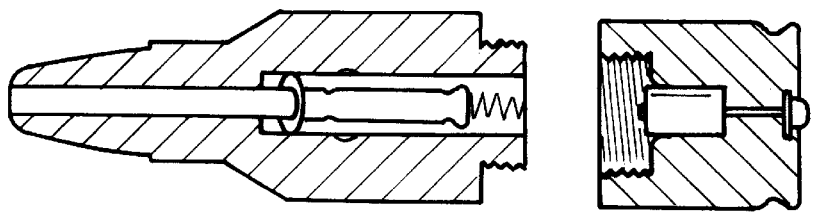
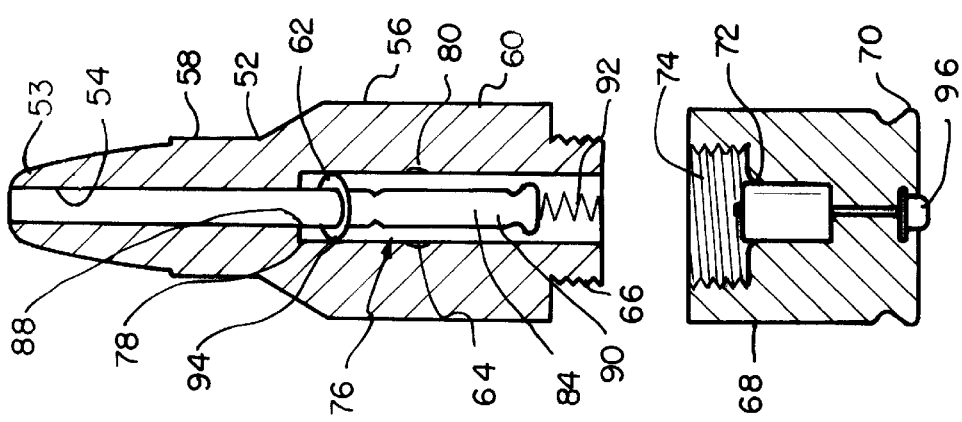
FIG. 5

LASER BEAM FOR SIGHT ALIGNMENT

RELATED APPLICATION

The present application is a continuation-in-part based on a parent application filed Aug. 14, 1997 under Ser. No. 08/911,100 now abandoned.

BACKGROUND OF THE INVENTION

1. Field of the Invention

The present invention relates to laser beam weapon systems and more particularly pertains to a new laser beam for sight alignment for projecting a beam of a light out of gun for the sight to be adjusted until it aligns with a dot formed by the beam on a target.

2. Description of the Prior Art

The use of laser beam weapon systems is known in the prior art. More specifically, laser beam weapon systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art laser beam weapon systems include U.S. Pat. No. 5,031,349 to Vogel; U.S. Pat. No. 4,76,907 to De Bernardini; U.S. Pat. No. Des. 274,089 to Morris, Jr. et al.; U.S. Pat. No. 5,153,375 to Eguizabal; U.S. Pat. No. 5,194,007 to Marshall et al.; and U.S. Pat. No. 5,323,555 to Jehn which are each incorporated herein by reference.

While these devices fulfill their respective, particular objectives and requirements, the aforementioned patents do not disclose a new laser beam for sight alignment. The inventive device includes a hollow cylindrical casing having a main cylindrical portion and a tapered end portion. The tapered end portion is coextensive with the main cylindrical portion. The main cylindrical portion has an open interior end. The tapered end portion has an opening in an outer end thereof. The cylindrical casing is dimensioned for being slidably received within a chamber of a gun. A lens is disposed within the opening in the outer end of the tapered end portion of the cylindrical casing. A laser module is disposed within the tapered end portion of the cylindrical casing inwardly of the lens.

In these respects, the laser beam for sight alignment according to the present invention substantially departs from the conventional concepts and designs of the prior art, and in so doing provides an apparatus primarily developed for the purpose of projecting a beam of a light out of gun for the sight to be adjusted until it aligns with a dot formed by the beam on a target.

SUMMARY OF THE INVENTION

In view of the foregoing disadvantages inherent in the known types of laser beam weapon systems now present in the prior art, the present invention provides a new laser beam for sight alignment construction wherein the same can be utilized for projecting a beam of a light out of gun for the sight to be adjusted until it aligns with a dot formed by the beam on a target.

The general purpose of the present invention, which will be described subsequently in greater detail, is to provide a new laser beam for sight alignment apparatus and method which has many of the advantages of the laser beam weapon systems mentioned heretofore and many novel features that result in a new laser beam for sight alignment which is not anticipated, rendered obvious, suggested, or even implied by any of the prior art laser beam weapon systems, either alone or in any combination thereof.

To attain this, the present invention generally comprises a hollow cylindrical casing having a main cylindrical portion and a tapered end portion. The tapered end portion is coextensive with the main cylindrical portion. The main cylindrical portion has an open interior end. The tapered end portion has an opening in an outer end thereof. The cylindrical casing is dimensioned for being slidably received within a chamber of a gun. A lens is disposed within the opening in the outer end of the tapered end portion of the cylindrical casing. A laser module is disposed within the tapered end portion of the cylindrical casing inwardly of the lens. A battery is positioned interiorly of the main cylindrical portion of the cylindrical casing. The battery has an electrical contact in communication with the laser module. An end cap is removably coupled with the open interior end of the main cylindrical portion of the cylindrical casing. An interior end of the end cap has an essentially U-shaped contact selectively engaging a rear contact of the battery. A power switch is slidably disposed within the end cap. The power switch has an interior end coupled with the U-shaped contact for selectively biasing the U-shaped contact into engagement with the battery.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new laser beam for sight alignment apparatus and method which has many of the advantages of the laser beam weapon systems mentioned heretofore and many novel features that result in a new laser beam for sight alignment which is not anticipated, rendered obvious, suggested, or even implied by any of the prior art laser beam weapon systems, either alone or in any combination thereof.

It is another object of the present invention to provide a new laser beam for sight alignment which may be easily and efficiently manufactured and marketed.

It is a further object of the present invention to provide a new laser beam for sight alignment which is of a durable and reliable construction.

An even further object of the present invention is to provide a new laser beam for sight alignment which is susceptible of a low cost of manufacture with regard to both materials and labor, and which accordingly is then susceptible of low prices of sale to the consuming public, thereby making such laser beam for sight alignment economically available to the buying public.

Still yet another object of the present invention is to provide a new laser beam for sight alignment which provides in the apparatuses and methods of the prior art some of the advantages thereof, while simultaneously overcoming some of the disadvantages normally associated therewith.

Still another object of the present invention is to provide a new laser beam for sight alignment for projecting a beam of a light out of gun for the sight to be adjusted until it aligns with a dot formed by the beam on a target.

Yet another object of the present invention is to provide a new laser beam for sight alignment which includes a hollow cylindrical casing having a main cylindrical portion and a tapered end portion. The tapered end portion is coextensive with the main cylindrical portion. The main cylindrical portion has an open interior end. The tapered end portion has an opening in an outer end thereof. The cylindrical casing is dimensioned for being slidably received within a chamber of a gun. A lens is disposed within the opening in the outer end of the tapered end portion of the cylindrical casing. A laser module is disposed within the tapered end portion of the cylindrical casing inwardly of the lens.

Still yet another object of the present invention is to provide a new laser beam for sight alignment that makes it easier to bore sight a rifle, pistol or shotgun.

Even still another object of the present invention is to provide a new laser beam for sight alignment that allows a gun to be zeroed in fewer shots.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new laser beam for sight alignment according to the present invention illustrated within a rifle.

FIG. 2 is a side view of the present invention shown interiorly of the rifle.

FIG. 3 is a perspective view of the present invention.

FIG. 4 is a cross-sectional view of the present invention as taken along line 4—4 of FIG. 3.

FIG. 5 is a partially exploded cross-sectional view of an alternate embodiment of the present embodiment.

FIG. 6 is a cross-sectional view of one of the shell casings of the alternate embodiment of FIG. 5 in an assembled orientation.

DESCRIPTION OF THE PREFERRED EMBODIMENT

Figure 7:
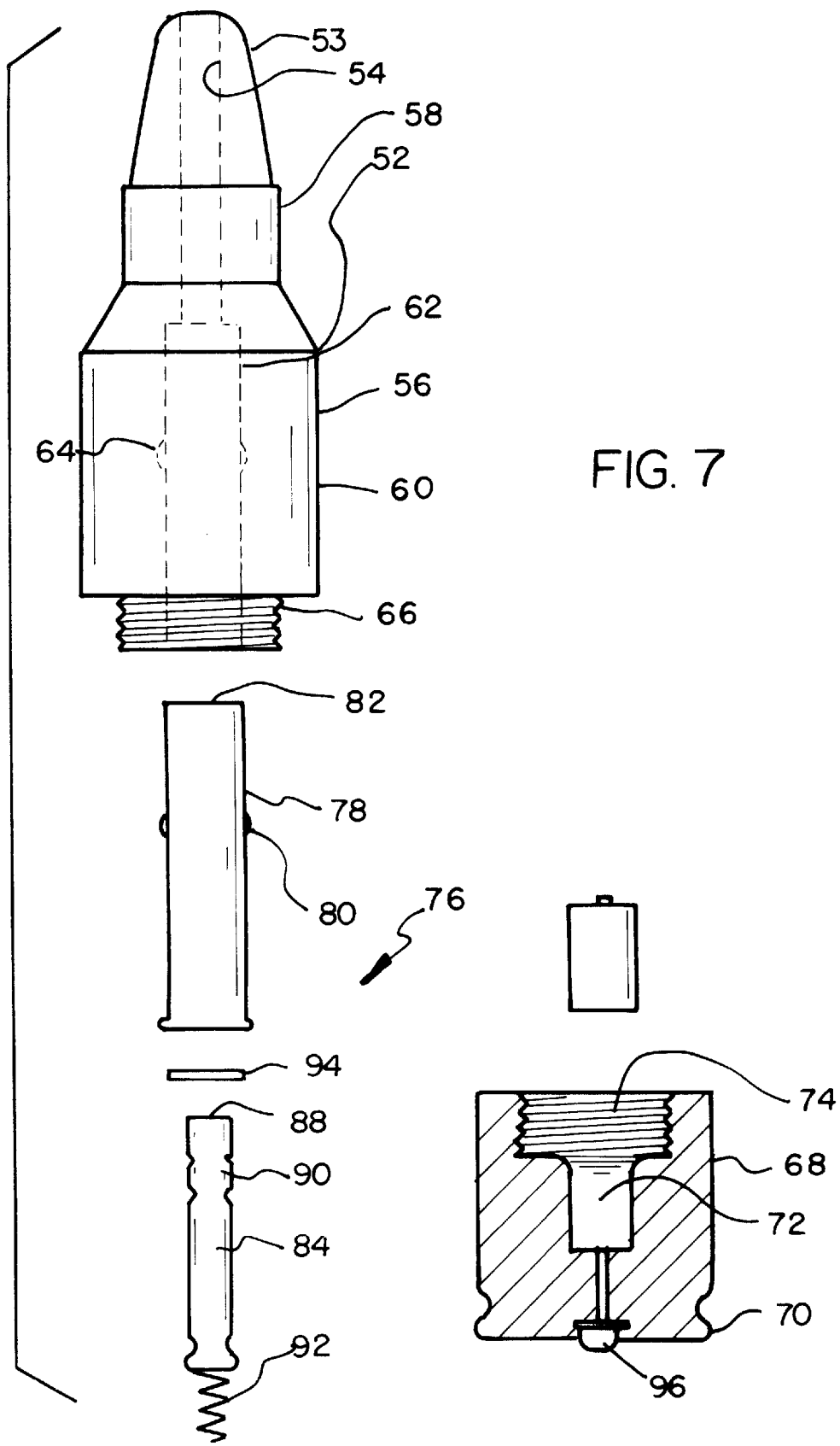
FIG. 7 is an exploded view of the present invention.

With reference now to the drawings, and in particular to FIGS. 1 through 7 thereof, a new laser beam for sight alignment embodying the principles and concepts of the present invention and generally designated by the reference numeral 10 will be described.

As best illustrated in FIGS. 1 through 4, the laser beam for sight alignment 10 comprises a hollow cylindrical casing 12 having a main cylindrical portion 14 and a tapered end portion 16. The tapered end portion 16 is coextensive with the main cylindrical portion 14. The main cylindrical portion 14 has an open interior end 18. The tapered end portion 16 has an opening 20 in an outer end thereof. The cylindrical casing 12 is dimensioned for being slidably received within a chamber 22 of a gun 24.

A lens 26 is disposed within the opening 20 in the outer end of the tapered end portion 16 of the cylindrical casing 12.

A laser module 28 is disposed within the tapered end portion 16 of the cylindrical casing 12 inwardly of the lens 26.

A battery 30 is positioned interiorly of the main cylindrical portion 14 of the cylindrical casing 12. The battery 30 has an electrical contact 32 in communication with the laser module 28.

An end cap 34 is removably coupled with the open interior end 18 of the main cylindrical portion 14 of the cylindrical casing 12. An interior end of the end cap 34 has an essentially U-shaped contact 36 selectively engaging a rear contact of the battery 30.

A power switch 38 is slidably disposed within the end cap 34. The power switch 38 has an interior end 40 coupled with the U-shaped contact 36 for selectively biasing the U-shaped contact 36 into engagement with the battery 30.

In use, a user would turn the device 10 on and insert it into the chamber 22 of the gun 24 and place the gun 24 on a steady rest with the barrel pointed at a target or another flat surface. The laser module 28 would project a bright red dot onto the target, and the user would adjust the scope until the reticle lines up with the dot projected by the laser module 28. Once this process is completed, the scope would be bore sighted, and a bullet fired from a conventional cartridge should strike very near the point indicated by the crosshairs or other reticles.

As shown in FIGS. 5–7, another embodiment 50 of the present invention is provided including a plurality of conductive shell casings 52 each including a frusto-conical front portion 53 with a bore 54 formed therein. See FIG. 6. Each shell casing further has an intermediate portion 56 with a front extent 58 having a cylindrical configuration coupled to the front portion in coaxial alignment therewith. The intermediate portion of each shell casing also includes a rear extent 60 with a length and a diameter of about twice that of the front extent.

The intermediate portion of each shell casing is also equipped with a cylindrical recess 62 formed therein with a front open end in communication with the bore of the front portion. A pair of diametrically opposed indents 64 are formed in a central extent of an inner surface of the cylindrical recess, as shown in FIG. 6. The shell casings each includes a threaded sleeve 66 coupled to the intermediate portion about a rear open end thereof.

With continuing reference to the Figures, the shell casings each also have a rear portion 68 with a front open end, a rear closed end, an outer surface having a diameter equal to that of the intermediate portion. A radially extending annular flange 70 is formed about the periphery of the rear closed end of the rear portion similar to that of a conventional bullet shell. A cylindrical battery recess 72 is formed in a rear extent of the rear portion with a diameter equal to that of the cylindrical recess of the intermediate portion for accepting a cylindrical battery therein. A threaded recess 74 is formed in a front extent of the rear portion which is adapted for releasably engaging the threaded sleeve of the intermediate portion.

It should be noted that the shell casings each have cylindrical recesses which are equipped with a common length and a common diameter. Further, the shell casings have an unique overall outer diameter and an unique overall length. In the preferred embodiment, the outer diameters of the shell casings are fractions of an inch greater than conventionally sized bullets for affording a snug fit within the appropriate firearm.

Next provided is a laser module 76 adapted for being slidably and removably situated within the cylindrical recess of one of the shell casings. Which shell casing is used is dependent on the size of the firearm being used therewith. As best shown in FIG. 7, the laser module includes a conductive housing 78 with a circular front face and a tubular side wall coupled to a periphery of the front face and extending rearwardly therefrom for defining an open rear face. The side wall of the housing has a diameter slightly less than that of the cylindrical recesses of the shell casings. Further, a pair of diametrically opposed detents 80 are formed on the housing for engaging the indents of the shell casings. For reasons that will soon become apparent, the front face of the housing of the laser module has a hole 82 formed therein. Such hole is adapted to be aligned with the bore of the front portion of the shell casing in which it is inserted.

The laser module further includes a laser 84 with a cylindrical configuration having a length equal to that of the housing and a diameter less than that of the housing. The laser has a front end with a laser emitter 88 mounted thereon for emitting a laser therefrom upon the receipt of power. A conductive shell 90 is formed about the laser. Further, a coil spring 92 is mounted on a rear end of the laser and extends therefrom in coaxial relationship therewith. In use, the coil spring is adapted for abutting a first contact of the battery such that power is received via the coil spring.

Mounted about the conductive shell of the laser is a brass O-ring 94, or furrow, that resides adjacent to the front end of the laser. Annular recesses may be formed in the laser to accommodate coupling of the O-ring thereto. The brass O-ring remains in electrical communication with the laser. As shown in FIGS. 5 & 6, the laser and the brass O-ring are positioned within the housing in electrical communication therewith. As such, the conductive shell of the laser is in electrical communication with the rear portion of the shell casing in which it is inserted. It should be noted that during assembly, the O-ring allows slight movement of the laser within the housing for alignment purposes. Once aligned, the laser is preferably maintained in place by way of a UV-cured glue or adhesive.

Finally, the shell casings each have a push button momentary switch 96 mounted on an exterior of the rear closed end of the rear portion thereof. This switch is equipped with a first contact in communication with the shell casing for communication with the conductive shell of the laser when the laser module is inserted therein. Further, a second contact of the switch is connected to a second contact of the battery by way of an insulated wire or the like. By this interconnection, power is supplied to the laser only upon the depression of the switch. The instant embodiment of the present invention thus provides a system which allows the use of a single laser module with multiple uniquely sized shell casings. Further, the instant embodiment provides for precise adjustment of a laser prior to use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A gun alignment system comprising, in combination:
    at least one shell including a front portion and a rear portion removably coupled to define an interior space;
    a laser module removably positioned within the interior space of the shell for emitting a laser from the shell upon the receipt of power;
    a battery positioned within the interior space of the shell for supplying the laser module with power; and
    wherein the laser module is releasably coupled in the shell via at least one indent and at least one detent.

2. A gun alignment system as set forth in claim 1 wherein a plurality of shells are included each with a recess sized similar to that of the laser module and an outer surface with a unique length and a unique diameter.

3. A gun alignment system as set forth in claim 1 wherein the laser module includes a housing, a laser positioned within the housing, and an O-ring mounted between the housing and the laser for alignment purposes.

4. A gun alignment system as set forth in claim 1 wherein the battery is removably positioned in the rear portion of the shell.

5. A gun alignment system as set forth in claim 1 and further including a push button mounted on the rear portion of the shell and connected between the battery and the laser module for supply power thereto only upon the depression thereof.

6. An apparatus for sight alignment by projecting a beam of light out of a rifle such that a sight of the rifle may be adjusted such that the sight substantially aligns with a dot formed by the beam of light projected onto a target, said apparatus comprising, in combination:
    a rifle having a barrel and a chamber for holding a bullet to be fired from said rifle; and
    a self contained laser beam generating device received in the chamber of the rifle, said laser beam generating device comprising:

a hollow cylindrical casing having a main cylindrical portion and a tapered end portion, the tapered end portion being coextensive with the main cylindrical portion, the main cylindrical portion having an open interior end, the tapered end portion having an opening in an outer end, the cylindrical casing being dimensioned for being insertable into and removable from the chamber of the rifle, wherein the hollow cylindrical casing has an annular recess formed therein adjacent to the open interior end thereof;

a lens, said lens being disposed within the opening in the outer end of the tapered end portion of the cylindrical casing;

a laser module, said laser module being disposed within the tapered end portion of the cylindrical casing inwardly of the lens such that the laser module abuts the lens for preventing debris becoming lodged between the laser module and the lens for preventing inadvertent light dispersion by debris, said laser module being for projecting the beam of light towards the lens, said lens being adapted to project the beam of light through and out of the barrel of the rifle;

a battery positioned entirely within an interior of the main cylindrical portion of the cylindrical casing, the battery providing electrical power to said laser module and having an electrical contact in communication with the laser module;

an end cap, said end cap having exterior threads to selectively engage interior threads of the cylindrical casing for being removably coupled to the open interior end of the main cylindrical portion of the cylindrical casing to permit insulation and removal of said battery in the interior of said cylindrical casing, an interior end of the end cap having an essentially U-shaped contact, said U-shaped contact being for selectively engaging a rear contact of the battery, wherein the end cap has a knurled annular flange formed thereon for facilitating gripping and removal of the end cap; and a power switch, said power switch being disposed within an interior of the end cap, said power switch being slidable with respect to the end cap along a longitudinal axis of the end cap, the power switch having an interior end, said interior end of said power switch being coupled to the U-shaped contact, said power switch being for selectively biasing the U-shaped contact into engagement with the battery, whereby said laser module is selectively provided power from said battery prior to insertion of said laser beam sighting assembly into said rifle chamber; and wherein said lens, said laser module, and said battery are completely contained in said cylindrical casing to permit easy insertion into and removal from the chamber of said rifle and storage in bullet storage devices.

7. A system for sight alignment by projecting a beam of light out of one of a plurality of uniquely sized rifles such that a sight of the rifle may be adjusted such that the sight substantially aligns with a dot formed by the beam of light projected onto a target, said system comprising, in combination:

a plurality of conductive shell casings each including a frusto-conical front portion with a bore formed therein and an intermediate portion having a front extent having a cylindrical configuration coupled to the front portion in coaxial alignment therewith and a rear extent with a length and a diameter of about twice that of the front extent, the intermediate portion including a cylindrical recess formed therein with a front open end in communication with the bore of the front portion, a rear open end, and a pair of diametrically opposed indents formed in a central extent of an inner surface thereof, the shell casings each including a threaded sleeve coupled to the intermediate portion about the rear open end of the cylindrical recess, the shell casings each further including a rear portion with a front open end, a rear closed end, an outer surface having a diameter equal to that of the intermediate portion, a radially extending annular flange formed about the periphery of the rear closed end of the rear portion, a cylindrical battery recess formed in a rear extent thereof with a diameter equal to that of the cylindrical recess of the intermediate portion for accepting a cylindrical battery therein, a threaded recess formed in a front extent thereof adapted for releasably engaging the threaded sleeve of the intermediate portion;

said shell casings each having the cylindrical recesses of the intermediate portions thereof being equipped with a common length and a common diameter and further having an unique overall outer diameter and an unique overall length; and a laser module adapted for being slidably and removably situated within the cylindrical recess of one of the shell casings, the laser module including:

a conductive housing with a circular front face and a tubular side wall coupled to a periphery of the front face and extending rearwardly therefrom for defining an open rear face, the side wall of the housing having a diameter about equal to that of the cylindrical recesses of the shell casings and a pair of diametrically opposed detents for engaging the indents of the shell casings, wherein the front face has a hole formed therein for alignment with the bore of the front portion of the shell casing in which it is inserted;

a laser with a cylindrical configuration having a length equal to that of the housing and a diameter less than that of the housing, the laser having a front end with a laser emitter mounted thereon for emitting a laser therefrom upon the receipt of power, a conductive shell formed about the laser, and a coil spring mounted on a rear end of the laser and extending therefrom in coaxial relationship therewith for abutting a first contact of the battery such that power is received via the coil spring, and a brass O-ring mounted about the conductive shell of the laser adjacent to the front end thereof in electrical communication therewith, wherein the laser and the brass O-ring are positioned within the housing in electrical communication therewith such that the conductive shell of the laser is in electrical communication with the rear portion of the shell casing in which it is inserted;

said shell casings each having a push button momentary switch mounted on an exterior of the rear closed end of the rear portion thereof with a first contact in communication with the shell casing for communication with the conductive shell of the laser when the laser module is inserted therein and a second contact connected to a second contact of the battery, wherein power is supplied to the laser only upon the depression of the switch.

* * * * *